March 3, 1942.  C. E. MAYNARD  2,275,081
VALVE STEM
Filed Aug. 1, 1939   2 Sheets-Sheet 1
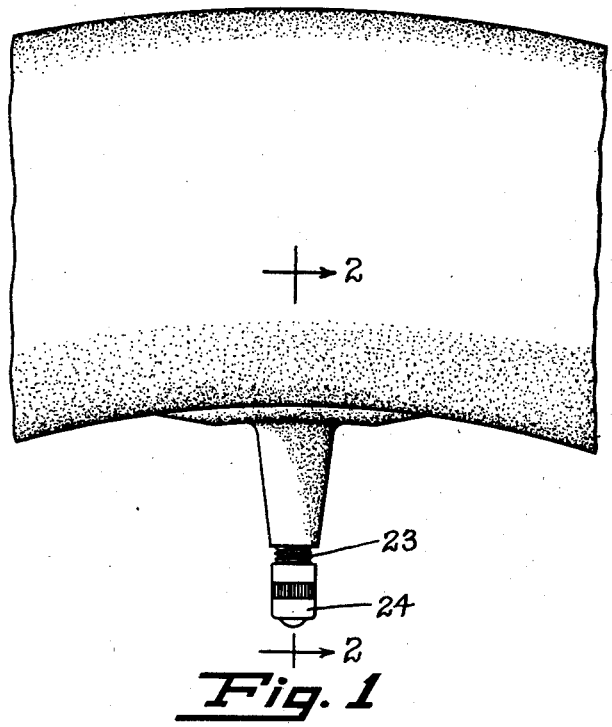
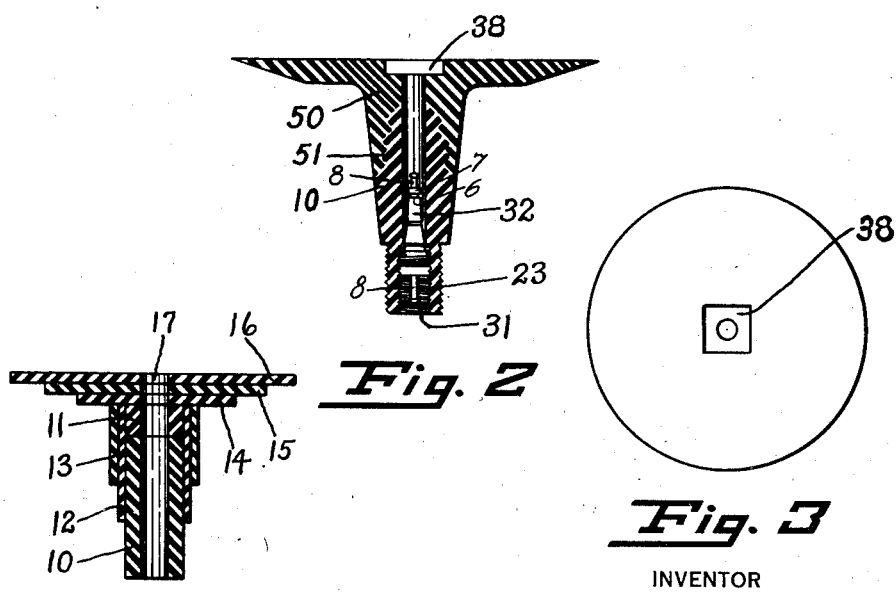
INVENTOR
CHARLES EDGAR MAYNARD
BY Chapin & Neal
ATTORNEYS March 3, 1942.          C. E. MAYNARD          2,275,081
VALVE STEM
Filed Aug. 1, 1939          2 Sheets-Sheet 2

INVENTOR
CHARLES EDGAR MAYNARD
BY
Chapin & Neal
ATTORNEYS

Patented Mar. 3, 1942

2,275,081

UNITED STATES PATENT OFFICE 2,275,081

VALVE STEM

Charles Edgar Maynard, Northampton, Mass., assignor, by mesne assignments, to United States Rubber Company, New York, N. Y., a corporation of New Jersey Application August 1, 1939, Serial No. 287,755

11 Claims. (Cl. 152—429)

This invention relates to valve stems for inner tubes used with pneumatic tire casings.

According to present day practice the valve mechanism used in the valve stems of inner tubes are standardized so that the same valve mechanism may be used with valve stems of varying sizes and shapes. For some purposes the valve stem is formed entirely of metal with its lower end embedded in a body of rubber by which the stem is secured to the rubber tube. In another form the stem is made partly of metal and partly of rubber, the metal portion taking the form of a metal tube of relatively small diameter extending a greater or less distance into a tubular body of rubber to which the valve base is secured. The outer end of the metal tube in such construction extends outwardly beyond the rubber cover and is exteriorly threaded to receive the conventional valve cap, the interior of the metal tube being threaded to receive the standard valve mechanism which is inserted as a unit into the tube. The principal function of the metal element is to form a support for and serve as a protection for the valve element, but because of the fact that rubber does not readily adhere to metal, difficulty and expense are encountered in assembling the metal and rubber elements and securing a permanent bond at the time the rubber element is vulcanized. This difficulty is increased by the fact that in ordinary practice the valve and its pad are only partially cured prior to its assembly with the inner tube, the completion of the cure being effected at the time that the inner tube itself is vulcanized. The use of the metal tube also represents an added element of expense since it is necessary to construct it from a non-corrodible metal such as brass.

The principal object of the invention is to provide a unitary stem structure formed entirely from a moldable plastic material. A further object is to secure a reduction in the cost of the valve stem, both as to material and labor costs. Other and further objects residing in the details of structure and in the method of making the same will be made apparent in the following specification and claims.

According to my invention I dispense entirely with metal in the construction of the valve stem and form the valve stem entirely from a heat-settable, moldable plastic which may be rubber or one of the rubber-like thermoplastics or a combination of the two. In the accompanying drawings which illustrate one embodiment of my invention, the valve stem is shown as formed of two or more rubber compounds respectively compounded to cure to varying degrees of hardness.

In the drawings:

Fig. 1 is a side elevation of a portion of an inner tube to which a valve stem constructed according to my invention is attached;

Fig. 2 is a sectional view of the valve stem with the valve element assembled therein, taken substantially on line 2—2 of Fig. 1;

Fig. 3 is a plan view showing the bottom surface of the valve pad of the valve stem of Fig. 2;

Fig. 4 is a sectional view showing one manner of assembling the raw rubber parts in the construction of my valve stem;

Figure 5:
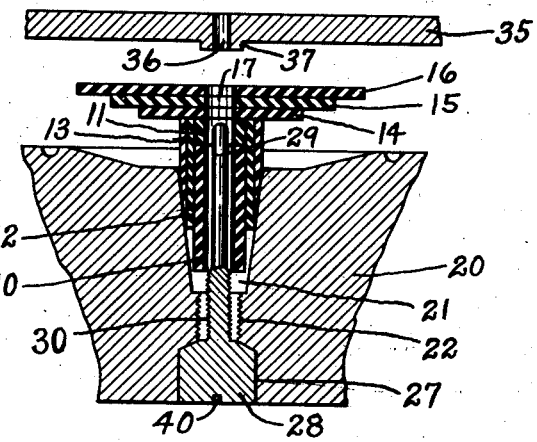
Fig. 5 is a vertical section of a mold cavity suitable for the vulcanization or partial vulcanization of the valve stem, the mold being shown partly disassembled and a raw valve stem partially inserted.
Figure 6:
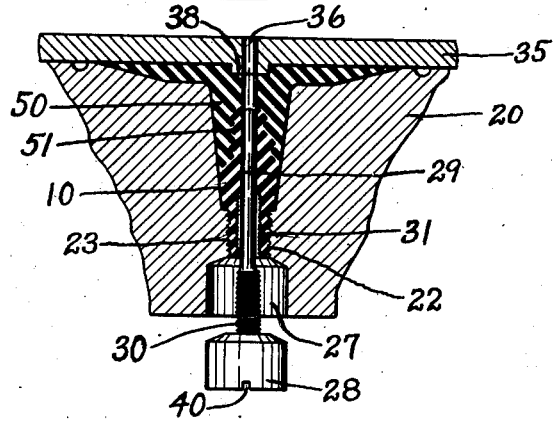
Fig. 6 is a view similar to Fig. 5, showing the valve stem in cured or partially cured condition in the mold with the mold parts indicating the initial step in its disassembly.
Figure 7:
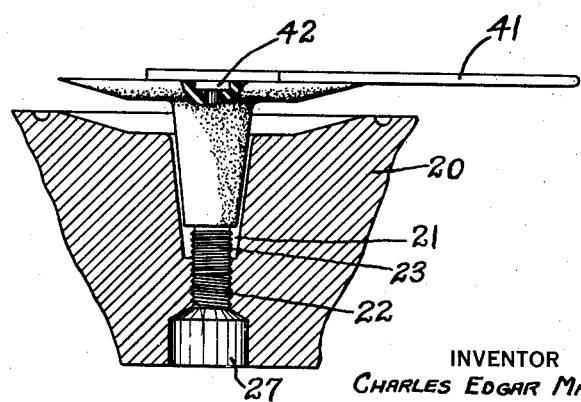
Fig. 7 shows the method of disengaging the cured or partially cured stem from the mold.

Referring to Fig. 4, I provide a cylindrical rubber core member 10 formed of a rubber compound such as will cure to a "hard" consistency. The member 10 may be extruded in hollow cylindrical form by means of a conventional tuber or it may be constructed by wrapping a strip of suitably compounded rubber around a mandrel. Aligned at the base of element 10 is a short cylindrical element 11 formed of a softer curing compound. If desired, element 11 may be omitted and member 10 extended to the base if rigidity at that point is required, or element 11 may be lengthened and member 10 correspondingly shortened to obtain a more flexible stem. Around the elements 10 and 11 is wrapped a layer of rubber 12, compounded so that when cured it will be relatively "soft" as compared to the core 10. A second layer 13 is then applied around the layer 12, layer 13 being shorter than the preceding layer 12. Circular or oval layers 14, 15, 16 of successively increasing sizes are plied together and applied to the base of the composite stem formed by the members 10, 11, 12, and 13 to form the pad portion of the valve stem. The layers 14, 15, and 16 are apertured as at 17, the aperture 17 forming a continuation of the bore of the members 10 and 11. The so assembled valve stem is then inserted as shown in Fig. 5 into a suitable mold for curing. As shown in Fig. 5, the mold comprises a main body member 20 provided with a cavity 21 conforming to the desired shape of the valve stem and pad. The portion of the cavity 21 which is to mold the outer end of the valve stem is threaded as indicated at 22 to form upon the outer end of the valve stem exterior threads 23 (Figs. 1 and 2) for the reception of a conventional valve cap 24. The base of mold member 20 is provided with an opening 27 communicating with the cavity 21 and adapted to receive a circular plug 28 from which extends a pin 29 adapted to mold the bore of the valve stem. The portion of pin 29 adjacent the plug 28 is threaded as indicated at 30 for the purpose of providing the outer end of the finished valve stem with interior threads 31, as best shown in Fig. 2, for the reception of the valve mechanism indicated generally at 32 in Fig. 2. The valve mechanism may be of any suitable type, that shown being of a conventional type having a valve seat at 6 against which the valve element 7 carried by pin 8 seats in the conventional manner. The threads 31 by their engagement with the threads 9 provided on the body of the valve mechanism 32 releasably secure the valve mechanism in the stem. The mold member 20 is provided with a cover plate 35 which molds the base of the valve pad portion of the valve stem. The plate 35 is provided with an aperture 36 through or into which the free end of pin 29 extends when the mold is in closed position. The inner face of plate 35 is provided with a boss 37 which surrounds the opening 36. Boss 37 is shaped to mold a square or other non-circular depression in the base of the valve stem as indicated at 38 in Figs. 2 and 3. After the curing operation of the first step in disassembling the mold parts and removing the cured or partially cured valve stems from the mold is the removal of pin 29 which is in threaded engagement at 30 with the interior threads of the valve stem. Plug 28 is provided with a slot 40 for the reception of a screw driver by which the portion 30 may be unscrewed from the valve stem. As shown in Fig. 6, the threading engagement of the valve stem and mold at 22 together with the engagement of the boss 37 in the depression 38 of the valve pad prevents rotation of the valve stem in the mold during the removal of the pin 29. The cover plate 35 is then removed. The valve stem is now unscrewed from its threaded connection with the mold at the portion 22 by means of a wrench 41 having a boss 42 adapted to fit in the depression 38 molded in the base of the valve pad by the boss 37.

Referring to Fig. 2, the hard cylindrical portion 10 and the softer outer portion 50 (formed from the stepped-off laminations 12 and 13) have been integrally vulcanized together at their juncture 51. The greater hardness of the core portion 10 may be obtained by increasing the sulphur content of the compound beyond that of the outer portion 50. During the curing operation a slight migration of the sulphur takes place at the juncture 51 of the two compounds which results in a certain degree of graduation from the extreme hardness of the core 10 to the softness of the outer portion 51. The degree of graduation may be increased by compounding the layer 12 with an amount of sulphur intermediate that of the core 10 and outer layer 13. In any event, the core disappears as a discrete element and becomes an integral portion of the valve stem. The core 10 is made sufficiently hard so that the threads 31 and 23 formed therein will firmly hold the valve mechanism 32 and valve cap 24 respectively.

The actual compounding of the various rubber portions is subject to substantial variation to meet differing service conditions. In general, however, by the term "hard rubber" is meant a compound containing over 25 parts of sulphur for every 100 parts of rubber, and by "soft rubber" is meant a compound containing from 5 to 10 parts of sulphur for every 100 parts of rubber. By "intermediate" stock or "semi-hard" compound is meant any compound that contains the characteristics of either the soft or hard rubber or both, and such stocks would usually contain between 10 and 25 parts of sulphur to every 100 parts of rubber. The compounds may contain other usual ingredients, such as pigments, accelerators, etc.

It will be seen that in the embodiment above described the valve stem is composed entirely of two or more rubber compounds, yielding hard and soft rubbers, the bond between the hard and soft rubbers being secured by their simultaneous vulcanization in one operation. Alternatively the hard rubber portion could be first semi-cured and the soft portions subsequently molded and vulcanized, adhesion between the rubber compounds being secured by the use of a vulcanizing cement applied to the semi-cured hard rubber.

In the compounding of the hard rubber portion it may be found of advantage to incorporate synthetic rubber in the compound.

While in the illustration above given the moldable plastic employed is a rubber compound, other moldable plastics such as any of the well known thermoplastics may be employed either alone or mixed with rubber to get a product with physical properties similar to those obtained above.

If desired, the stem may be molded without threads, the threads 23 and 31 being formed subsequent to the curing operation by means of a die and tap respectively.

By my invention the cost of the valve stem is materially decreased since the valve stem is molded completely in one operation and the cost of the brass core is wholly eliminated. Furthermore, a completely unitary structure is provided together with the elimination of that tendency for separation of the parts which exists wherever metal and rubber are combined.

I claim:

1. A valve stem, for pneumatic tubes and the like, composed entirely of molded heat-set plastic material and including a stem portion and a base portion, said stem portion being provided with a valve receiving bore formed in the material of the stem which extends from the free end of the stem portion to and through the base portion and means formed in and integral with the wall of the bore for releasably securing a valve mechanism in the bore.

2. A valve stem, for pneumatic tubes and the like, composed entirely of molded heat-set plastic materials and including a stem portion and a base portion, said stem portion being provided with a valve receiving bore formed in the material of the stem which extends from the free end of the stem portion to and through the base portion, and means formed in and integral with the wall of the bore for releasably securing a valve mechanism in the bore, at least that portion of the wall of the bore in which said means is formed being harder than the balance of the stem.

3. A valve stem, for pneumatic tubes and the like, composed entirely of molded heat-set plastic material and including a stem portion and a base portion, said stem portion being provided with a valve receiving bore formed in the material of the stem which extends from the free end of the stem portion to and through the base portion, the bore being provided adjacent the free end of the stem portion with threads formed in the plastic material for the reception of a valve mechanism.

4. A valve stem, for pneumatic tubes and the like, composed entirely of molded heat-set plastic material and including a stem portion and a base portion, said stem portion being provided with a valve receiving bore formed in the material of the stem which extends from the free end of the stem portion to and through the base portion, the bore being provided adjacent the free end of the stem portion with threads formed in the plastic material for the reception of a valve mechanism, at least the threaded portion of the bore wall being harder than the balance of the stem.

5. A valve stem, for pneumatic tubes and the like, composed entirely of molded heat-set plastic material and including a stem portion and a base portion, said stem portion being provided with a valve receiving bore formed in the material of the stem which extends from the free end of the stem portion to and through the base portion, the free end of the stem portion being provided with interior and exterior threads formed in the plastic material, at least the threaded parts of the stem portion being harder than the balance of the stem.

6. A valve stem, for pneumatic tubes and the like, composed entirely of molded heat-set plastic materials and including a stem portion and a base portion, said stem portion being provided with a valve receiving bore formed in the material of the stem which extends from the free end of the stem portion to and through the base portion, the walls of said bore outwardly of the base portion being harder than the balance of the stem.

7. A valve stem, for pneumatic tubes and the like, composed entirely of molded heat-set plastic materials and including a stem portion and a base portion, said stem portion being provided with a valve receiving bore formed in the material of the stem which extends from the free end of the stem portion to and through the base portion, the free end portion of the stem portion and at least the adjacent portion of the wall of said bore being harder than the balance of the stem.

8. A valve stem, for pneumatic tubes and the like, composed entirely of molded heat-set plastic materials and including a stem portion and a base portion, said stem portion being provided with a valve receiving bore formed in the material of the stem which extends from the free end of the stem portion to and through the base portion, the free end portion of the stem portion and at least the adjacent portion of the wall of said bore being harder than the balance of the stem, the harder portions of the stem and bore wall being provided with threads.

9. A valve stem, for pneumatic tubes and the like, composed entirely of molded heat-set plastic material and including a stem portion and a base portion, said stem portion being provided with a valve receiving bore formed in the material of the stem which extends from the free end of the stem portion to and through the base portion, the stem portion being of increasing hardness inwardly from the outer surface to the bore.

10. A valve stem, for pneumatic tubes and the like, composed entirely of vulcanized rubber compounds and including a stem portion and a base portion, said stem portion being provided with a valve receiving bore formed in the material of the stem which extends from the free end of the stem portion to and through the base portion, the wall portion of the bore, at least adjacent the free end of the stem portion, being compounded with sulphur in excess of 25 parts of sulphur for every 100 parts of rubber.

11. A valve stem, for pneumatic tubes and the like, composed entirely of vulcanized rubber compounds and including a stem portion and a base portion, said stem portion being provided with a valve receiving bore formed in the material of the stem which extends to and through the base portion, the free end of the stem portion and at least that portion of the bore wall adjacent thereto, being compounded with sulphur in excess of 25 parts of sulphur for every 100 parts of rubber the balance of the valve stem being compounded with less than 25 parts of sulphur for every 100 parts of rubber.

CHARLES EDGAR MAYNARD.